United States Patent
Krishnaswamy et al.

(10) Patent No.: US 9,451,415 B2
(45) Date of Patent: Sep. 20, 2016

(54) COOPERATIVE DATA TRANSPORT

(75) Inventors: Dilip Krishnaswamy, San Diego, CA (US); Samir S. Soliman, San Diego, CA (US); Srinivasa R. Eravelli, San Diego, CA (US); Rajat Gupta, La Jolla, CA (US); Jose Ricardo dos Santos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 904 days.

(21) Appl. No.: 13/162,926

(22) Filed: Jun. 17, 2011

(65) Prior Publication Data
US 2012/0321008 A1 Dec. 20, 2012

(51) Int. Cl.
*H04W 4/00* (2009.01)
*H04W 4/06* (2009.01)
*H04W 88/04* (2009.01)

(52) U.S. Cl.
CPC ............. *H04W 4/06* (2013.01); *H04W 88/04* (2013.01)

(58) Field of Classification Search
CPC ............................. H04W 4/06; H04W 88/04
See application file for complete search history.

(56) References Cited

U.S. PATENT DOCUMENTS

| | | | |
|---|---|---|---|
| 6,178,448 B1 | 1/2001 | Gray et al. | |
| 7,339,897 B2 | 3/2008 | Larsson et al. | |
| 7,349,380 B2 | 3/2008 | Barker, Jr. et al. | |
| 7,359,971 B2 | 4/2008 | Jorgensen | |
| 7,376,087 B2 | 5/2008 | Srikrishna | |
| 7,561,517 B2 | 7/2009 | Klinker et al. | |
| 7,643,427 B2 | 1/2010 | Kokku et al. | |
| 7,796,503 B2 | 9/2010 | Hamada et al. | |
| 8,320,250 B2 | 11/2012 | Speight | |
| 2002/0080755 A1 | 6/2002 | Tasman et al. | |
| 2002/0083172 A1 | 6/2002 | Knowles et al. | |
| 2006/0098611 A1* | 5/2006 | Joshi et al. .................. 370/338 |
| 2006/0105764 A1* | 5/2006 | Krishnaswamy ....... H04L 45/22 455/424 |
| 2006/0193295 A1 | 8/2006 | White et al. | |
| 2007/0005787 A1* | 1/2007 | Igarashi et al. .............. 709/230 |
| 2007/0087829 A1* | 4/2007 | Liu et al. ........................ 463/42 |

(Continued)

FOREIGN PATENT DOCUMENTS

| | | |
|---|---|---|
| EP | 1786151 A2 | 5/2007 |
| EP | 2040390 A1 | 3/2009 |

(Continued)

OTHER PUBLICATIONS

Agrawal, P., et al., "MTorrent: A multicast enabled BitTorrent protocol", Communication Systems and Networks (COMSNETS), 2010 Second International Conference on, IEEE, Piscataway, NJ, USA, Jan. 5, 2010, pp. 1-10, XP031670909, ISBN: 978-1-4244-5487-7.

(Continued)

*Primary Examiner* — Phirin Sam
*Assistant Examiner* — Hai-Chang Hsiung
(74) *Attorney, Agent, or Firm* — Charles E. Eggers

(57) ABSTRACT

Various arrangements for cooperative data transport are presented. These arrangements may include a first mobile device configured to receive, via a first wireless network, a first set of shared data. The first set of shared data may be shared among a plurality of mobile devices using a second wireless network. The first mobile device may also receive, via the first wireless network, a first set of private data, wherein the first set of private data is intended for the first mobile device. The first set of private data may not be shared among the plurality of mobile devices.

42 Claims, 7 Drawing Sheets

(56) References Cited

U.S. PATENT DOCUMENTS

| | | | |
|---|---|---|---|
| 2007/0094325 | A1 | 4/2007 | Ih et al. |
| 2007/0109990 | A1* | 5/2007 | Bennett .......................... 370/328 |
| 2007/0211720 | A1 | 9/2007 | Fuchs et al. |
| 2007/0291765 | A1 | 12/2007 | Boley et al. |
| 2008/0108437 | A1 | 5/2008 | Kaarela et al. |
| 2008/0133767 | A1 | 6/2008 | Birrer et al. |
| 2008/0247355 | A1* | 10/2008 | Ahn ............................. 370/328 |
| 2008/0268904 | A1 | 10/2008 | Tanaka |
| 2008/0298303 | A1 | 12/2008 | Tsirtsis |
| 2009/0201813 | A1 | 8/2009 | Speight |
| 2009/0252200 | A1* | 10/2009 | Dohler et al. ................. 375/141 |
| 2009/0253417 | A1 | 10/2009 | Soma et al. |
| 2009/0325479 | A1 | 12/2009 | Chakrabarti et al. |
| 2010/0020753 | A1 | 1/2010 | Fulknier et al. |
| 2010/0074119 | A1 | 3/2010 | Krishnaswamy |
| 2010/0135266 | A1 | 6/2010 | Karaoguz et al. |
| 2010/0150161 | A1 | 6/2010 | Saksena et al. |
| 2010/0315973 | A1 | 12/2010 | Hirano et al. |
| 2010/0329248 | A1 | 12/2010 | Eggert et al. |
| 2011/0055901 | A1* | 3/2011 | Karaoguz et al. ................. 726/4 |
| 2011/0149739 | A1 | 6/2011 | Sarkar |
| 2011/0235578 | A1 | 9/2011 | Laganier et al. |
| 2011/0252151 | A1 | 10/2011 | Lu et al. |
| 2011/0296006 | A1 | 12/2011 | Krishnaswamy et al. |
| 2012/0020248 | A1 | 1/2012 | Granlund et al. |
| 2012/0236801 | A1 | 9/2012 | Krishnaswamy et al. |
| 2012/0243441 | A1 | 9/2012 | Reunamaki et al. |
| 2012/0320752 | A1 | 12/2012 | Gouache et al. |
| 2012/0331160 | A1 | 12/2012 | Tremblay et al. |
| 2013/0031256 | A1 | 1/2013 | Hampel |
| 2013/0077501 | A1 | 3/2013 | Krishnaswamy et al. |

FOREIGN PATENT DOCUMENTS

| | | | |
|---|---|---|---|
| EP | 2495927 | A1 | 9/2012 |
| JP | 2007043678 | A | 2/2007 |
| JP | 2008278197 | A | 11/2008 |
| JP | 2009253752 | A | 10/2009 |
| JP | 2009296084 | A | 12/2009 |
| JP | 2010504047 | A | 2/2010 |
| WO | 2005011173 | A2 | 2/2005 |
| WO | WO-2008078633 | A1 | 7/2008 |
| WO | 2010008615 | A1 | 1/2010 |
| WO | WO2010027858 | A2 | 3/2010 |
| WO | 2011041798 | | 4/2011 |
| WO | 2011073495 | A1 | 6/2011 |

OTHER PUBLICATIONS

Andersen, D., et al., "Resilient Overlay Networks", MIT Laboratory for Computer Science, 2001, ACM SIGOPS Operating Systems Review Homepage, vol. 35 Issue 5, Dec. 2001, pp. 131-145, ron© nms.lcs.mit.edu.

Han H., et al., "Multi-Path TCP: A Joint Congestion Control and Routing Scheme to Exploit Path Diversity in the Internet", IEEE/ACM Transactions on Networking, IEEE/ACM, New York, NY, US, vol. 14, No. 6, Dec. 1, 2G06 (Dec. 1, 2006), pp. 1260-1271, XP011151888, ISSN: 1063-6692, DOI: 10.1109/TNET.2006.886738 p. 1262, left-hand column, line 19-line 32.

Hsieh, H.Y., et al., "A Transport Layer Approach for Achieving Aggregate Bandwidths on Multi-homed Mobile Hosts", School of Electrical and Computer Engineering Georgia Institute of Technology, Atlanta, GA 30332, USA, MOBICOM'02, Sep. 23-28, 2002, Atlanta, Georgia, USA, pp. 83-94, {hyhsieh, siva}©ece.gatech.edu.

Huszak A., et al., "Content-aware interface selection method for multi-path video streaming in best-effort networks", Telecommunications, 2009. ICT '09. International Conference on, IEEE, Piscataway, NJ, USA, May 25, 2009, pp. 196-201, XP031485724, ISBN: 978-1-4244-2936-3 p. 197, left-hand column, line 7—p. 198, col. 18, line 21.

International Search Report and Written Opinion—PCT/US2012/042526—ISA/EPO—Feb. 22, 2013.

Li Y., et al., "SmartTunnel: A Multipath Approach to Achieving Reliability in the Internet", Department of Computer Sciences, University of Texas at Austin Internet Article, Jul. 31, 2006, pp. 1-13, XP002672146, Austin Retrieved from the Internet: URL:http://www.es.utexas.edu/ftp/pub/techreports/tr06-38.pdf [retrieved on Mar. 21, 2012] p. 2, right-hand column, line 12-line 34; figure 1 p. 11, left-hand column, line 4-line 14 p. 3.

Savage, S., et al., "The End-to-End Effects of Internet Path Selection", Department of Computer Science and Engineering University of Washington, Seattle, SIGCOMM '1999 8199 Cambridge, MA, USA ACM SIGCOMM Computer Communication Review Homepage, vol. 29 Issue 4, Oct. 1999, pp. 289-299.

Scharf M et al., "MCTCP: A Multipath Transport Shim Layer", Global Telecommunications Conference.(GLOBECOM 2011), 2011 IEEE, IEEE, Dec. 5, 2011, pp. 1-5, XP032119220, DOI: 10.1109/GL0C0M.2011.6134021 ISBN: 978-1-4244-9266-4.

Sheriff I., et al., "Multipath Selection in Multi-radio Mesh Networks", Broadband Communications, Networks Systems, 2006. Broadnets 2006. 3rd International Conference on, IEEE, Piscataway, NJ, USA, Oct. 1, 2006, pp. 1-11, XP031155972, ISBN: 978-1-4244-0424-7.

Stoica, I., et al., "Internet Indirection Infrastructure" IEEE /ACM Transactions on Networking, IEEE/ACM, New York, NY, US, vol. 12, No. 2, Apr. 1, 2004 pp. 205-218, XP001193285, ISSN: 1063-6692, DOI: 10.1109/TNET.2004.826279.

Warabino, T., et al., "Overhead Reduction of Internet Indirection Infrastructure (13) for Future Mobile and Wireless Communications", IEICE Transactions on Communications, Communications Society, Tokyo, JP, vol. E90B, No. 4, Apr. 1, 2007', pp. 761-768, XP001541830, ISSN: 0916-8516, DOI: 10.1093/IETCOM/E90-B.4.761.

Wischik D, et al., "Design, implementation and evaluation of congestion control for multipath TCP", proceedings of Usen.ix NSDI, Apr. 1, 2011, XP055045890, Boston, USA Retrieved from the Internet: URL:http://static.usenix.org/event/nsdi11/tech/full_papers/Wi schi k.pdf [retrieved on Nov. 28, 2012].

David G. Andersen, Alex C. Snoeren, Hari Balakrishnan "Best-Path vs. Multi-Path Overlay Routing", Proc. ACM SIGCOMM Internet Measurement Conference, 2003, pp. 91-100.

Feilner,"OpenVPN 101: introduction to OpenVPN", Telindus High-Tech Institute, Stijn Huyghe, Packt Publishing, Apr. 2006 25 pages.

Ford, et al., "Architectural Guidelines for Multipath TCP Development draft-ietf-mptcp-architecture-00", Internet-Draft, MPTCP Architecture, Feb. 2010, pp. 1-25.

Ford, "TCP Extensions for Multipath Operation with Multiple Addresses draft-ford-mptcp.multiaddressed-03", Internet Engineering Task Force, Mar. 8, 2010, University College London, 33 pages.

Hasegawa Y, et al.,"Improved data distribution for multipath TCP communication", IEEE Globecom, 2005, pp. 271-275.

Jardine, et al., "A hybrid architecture for massively multiplayer online games" Proceedings of the 7th ACM SIGCOMM Workshop on Network and System Support for Games, 2008, pp. 60-65.

Rojviboonchai K., et al., "An Evaluation of Multi-path Transmission Control Protocol (M/TCP) with Robust Acknowledgement Schemes", IEICE Trans Commun, 2004, pp. 2699-2707, vol.E87-B; No. 9.

Stewart, "Stream Control Transmission Protocol", Network Working Group, Sep. 2007, 153 pages.

Zhang M., et al.,"A Transport Layer Approach for Improving End-to-End Performance and Robustness Using Redundant Paths", Proceeding ATEC '04 Proceedings of the annual conference on USENIX Annual Technical Conference, USENIX Association Berkeley, CA, USA 2004, table of contents, 2004, pp. 1-14.

Baccelli, F., et al., "The one-to-many TCP overlay: a scalable and reliable multicast architecture", INFOCOM 2005, 24th Annual Joint Conference of the IEEE Computer and Communications Societies, Proceedings IEEE, vol. 3, no., pp. 1629, 1640 vol. 3, Mar. 13-17, 2005.

(56) References Cited

OTHER PUBLICATIONS

Mathis M., et al., "TCP Selective Acknowledgment Options", Oct. 1996, 12 pages.

Ford A., et al., "Architecture guideline for multipath TCP Development", Internet Engineering Task Force (IETF), Request for Comments: 6182, Mar. 2011, pp. 1-28, ISSN: 2070-1721, URL, http://tools.ietf.org/pdf/rfc6182.pdf.

Tonouchi M., "A Study on retransmission control of multipath-extended TCP", IPSJ SIG Technical Reports, vol. 2004, No. 21, Japan, Information Processing Society of Japan, Mar. 5, 2004.

Tonouchi M., "Design of Dynamic Multi Link TCP for Mobile Communication", Proceedings of Multimedia, Distributed, Cooperative and Mobile (DICOMO) Symposium, 1997-2006 Ver.1.1 [DVD-ROM], Japan, The Information Processing Society of Japan, vol. 2003, Jun. 2003.

\* cited by examiner

COOPERATIVE DATA TRANSPORT

BACKGROUND

Networks, such as wireless cellular networks, do not provide unlimited bandwidth. An application running that uses communication with a remote computer system over a network may be slowed or may not run correctly due to limited available network bandwidth. Further, a cost may be associated with transmitting data over a network. In some situations, the smaller the amount of data transmitted over the network, the lower the cost is to a user. Decreasing the amount of data exchanged over a network can permit the application to run faster, more efficiently, and/or save a user money.

SUMMARY

Systems, methods, devices, apparatuses, and computer program products are described for cooperative data transport. An example of a mobile device configured for cooperative data transport includes a processor, configured to analyze a first set of shared data. The first set of shared data may be received via a first wireless network using a first communication technique. The mobile device may be configured to be in communication with at least one other mobile device. The first set of shared data may be common to an application running on at least one other mobile device. The processor may be configured to determine that the first set of shared data is to be shared with the at least one other mobile device. The processor may be configured to analyze a first set of private data. The first set of private data may be intended for the mobile device. The first set of private data may be received via the first wireless network. The processor may be configured to determine that the first set of private data is not to be shared with the at least one other mobile device. The processor may be configured to cause the first set of shared data to be transmitted via a second communication technique to the at least one other mobile device. The first communication technique and the second communication technique may be different communication techniques.

Embodiments of such a mobile device may include one or more of the following: the first network is a wireless cellular network and the second communication technique utilizes a local wireless network; the mobile device utilizes an IP address of the at least one other mobile device; the mobile device serves as a wireless access point for the at least one other mobile device; shared data is communicated over a multipath transport connection between a gaming server and the mobile device, the multipath transport connection comprising a first path that utilizes the first communication technique and a second path via the at least one other mobile device that utilizes the second communication technique; private data is communicated over a multipath transport connection between a gaming server and the mobile device, the multipath transport connection comprising a first path that utilizes the first communication technique and a second path via the at least one other mobile device that uses the second communication technique; a second set of private data intended for the at least one other mobile device is in an encrypted form when the second set of private data is analyzed by the mobile device; the second communication technique comprises use of a local wireless protocol; the mobile device comprises a cellular phone; the mobile device further comprises: a first wireless communication interface configured to communicate using the first communication technique and a second wireless communication interface configured to communicate using the second communication technique.

An example of a method for cooperative data transport may include receiving, by a first mobile device, via a first wireless network, a first set of shared data. The first set of shared data may be common to an application running on a plurality of mobile devices. The first wireless network may utilize a first communication technique. The plurality of mobile devices may comprise the first mobile device and a second mobile device. The method may include determining, by the first mobile device, the first set of shared data is to be transmitted to each other mobile device of the plurality of mobile devices. The method may include receiving, by the first mobile device, via the first wireless network, a first set of private data. The first set of private data may be intended for the first mobile device. The first set of private data may not to be shared among the plurality of mobile devices. The method may include determining, by the first mobile device, the first set of private data is not to be transmitted to each other mobile device of the plurality of mobile devices. The method may include transmitting, by the first mobile device, via a second communication technique, the first set of shared data to each other mobile device of the plurality of mobile devices. The first communication technique and the second communication technique may be separate communication techniques.

Embodiments of such a method may include one or more of the following: receiving, by the first mobile device, via the first wireless network, a second set of private data, wherein the second set of private data comprises an indication that the second set of private data is intended for the second mobile device; transmitting, by the first mobile device, via the second communication technique, the second set of private data to the second mobile device; the first mobile device utilizes an IP address of the second mobile device; the first mobile device serves as a wireless access point for the second mobile device; shared data is communicated over a multipath transport connection between a gaming server and the first mobile device, the multipath transport connection comprising a first path via the first communication technique and a second path via the second communication technique; private data is communicated over a multipath transport connection between a gaming server and the first mobile device, the multipath transport connection comprising a first path via the first communication technique and a second path via the second mobile device and the second communication technique; a second set of private data intended for the at least one other mobile device is in an encrypted form when the second set of private data is analyzed by the mobile device; receiving, by the second mobile device, via a third wireless network, a second set of shared data, wherein the second set of shared data is to be shared among the plurality of mobile devices; transmitting, by the second mobile device, via the second communication technique, the second set of shared data to each other mobile device of the plurality of mobile devices; a ratio of the size of the first set of shared data to the size of the second set of shared data is at least partially based upon a ratio of bandwidth between the first mobile device and the first wireless network and bandwidth between the second mobile device and the second communication technique; the third wireless network and the first wireless network are the same wireless network; the first network is a wireless cellular network and the second communication technique utilizes a local wireless protocol; the second communication technique uses a local wireless network; and the cooperative data transport allows a game to be played between users operating the first mobile device and the second mobile device.

An example of an apparatus for cooperative data transport may include a first means for receiving, via a first communication technique, a first set of shared data and a first set of private data. The first set of shared data may be common to an application running on at least one other apparatus. The apparatus may include a second means for analyzing the first set of shared data and the first set of private data. The first set of shared data may be shared with at least one other apparatus. The first set of private data may not be shared with at least one other apparatus. The apparatus may include a third means for determining whether to share the first set of shared data or the first set of private data. The first set of private data may be determined not to be shared with the at least one other apparatus. The first set of shared data may be determined to be shared with the at least one other apparatus. The apparatus may include a fourth means for transmitting, via a second communication technique, the first set of shared data to the at least one other apparatus. The first communication technique and the second communication technique may be separate communication techniques.

Embodiments of such an apparatus may include one or more of the following: an amount of shared data received by the apparatus is at least partially based upon bandwidth between the apparatus and a first wireless network; the apparatus utilizes an IP address of the at least one other apparatus; the apparatus serves as a wireless access point for the at least one other apparatus; the first communication technique uses a wireless cellular network and the second communication technique uses a local wireless network; the first means is further configured for receiving, via the first communication technique, a second set of private data, wherein the second set of private data comprises an indication that the second set of private data is intended for another apparatus; the fourth means is further configured for transmitting, via the second communication technique, the second set of private data to another apparatus; and the apparatus allows a game to be played between a first user interacting with the apparatus and a second user interacting with another apparatus in communication with the apparatus via the second communication technique.

An example of a computer program product for cooperative data transport residing on a non-transitory processor-readable medium and comprising processor-readable instructions may include instructions to analyze a first set of shared data received via the first wireless network. The first wireless network may use a first wireless technique. The first set of shared data may be shared among a plurality of mobile devices. The plurality of mobile devices may comprise the first mobile device and a second mobile device. The first set of shared data may be common to an application running on the plurality of mobile devices. The instructions may also include instructions to determine that the first set of shared data is to be shared among the plurality of mobile devices. The instructions may also include instructions to analyze a first set of private data received via the first wireless network. The first set of private data may be intended for the first mobile device. The first set of private data may not be shared among the plurality of mobile devices. The instructions may also include instructions to determine that the first set of private data is not to be shared among the plurality of mobile devices. The instructions may also include instructions to cause the first set of shared data to be transmitted, via a second wireless technique, to each other mobile device of the plurality of mobile devices. The first wireless technique and the second wireless technique may be different wireless techniques.

Embodiments of such a computer program product may include one or more of the following: an amount of shared data analyzed by the processor is at least partially based upon bandwidth with the first wireless network; the second communication technique uses a local wireless protocol; instructions to analyze a second set of private data received via the first communication technique, wherein the second set of private data comprises an indication that the second set of private data is intended for the second mobile device; instructions to cause the second set of private data to be transmitted, via the second communication technique, to the second mobile device; and the computer program product functions in conjunction with a game to be played between a first user operating the first mobile device and a second user operating the second mobile device.

An example of a system for cooperative data transport may include a computer system, configured to determine a first set of shared data is to be shared among a plurality of mobile devices. The first set of shared data may be common to an application running on the plurality of mobile devices. The computer system may be configured to transmit, via a first wireless network, the first set of shared data to a first mobile device. The plurality of mobile devices may comprise the first mobile device. The first set of shared data may comprise an indicator that indicates the shared data is to be shared among the plurality of mobile device. The computer system may be configured to determine a first set of private data is intended only for the first mobile device. The computer system may be configured to transmit, via the first wireless network, the first set of private data to the first mobile device.

Embodiments of such a system may include one or more of the following: the remote computer system is configured to select, from the plurality of mobile devices, the first mobile device to receive the first set of shared data at least partially based on a first amount of bandwidth between the first mobile device and the remote computer system compared with a second amount of bandwidth between a second mobile device of the plurality of mobile devices and the remote computer system; the remote computer system is further configured to determine a second set of private data is intended for a second mobile device of the plurality of mobile devices but that second set of private data is to be transmitted to the first mobile device, and transmit the second set of private data to the first mobile device; the first mobile device, configured to analyze the first set of shared data, wherein the first set of shared data is received via the first wireless network using a first communication technique; the first mobile device is configured to determine that the first set of shared data is to be shared among the plurality of mobile devices; the first mobile device is configured to analyze the first set of private data, wherein the first set of private data is intended for the first mobile device, and the first set of private data is received via the first wireless network; the first mobile device is configured to determine that the first set of private data is not to be shared with the plurality of mobile devices, and the first mobile device is configured to transmit the first set of shared data via a second communication technique to other mobile devices of the plurality of mobile devices, wherein the first communication technique and the second communication technique are different communication techniques; a second mobile device, configured to receive the first set of shared data from the first mobile device via the second communication technique; the remote computer system is further configured to determine a second set of shared data is to be shared among the plurality of mobile devices, wherein the second set of shared data is common to the application running on the plurality of mobile devices; the remote computer system is configured to transmit, via a second wireless network, the second set of shared data to the second mobile device, wherein the plurality of mobile devices comprises the second mobile device; the remote computer system is configured to determine a second set of private data is intended only for the second mobile device; and transmit, via the second wireless network, the second set of private data to the second mobile device; the second mobile device is further configured to analyze the second set of shared data, wherein the second set of shared data is received via the second wireless network using a third communication technique; the second mobile device is configured to determine that the second set of shared data is to be shared among the plurality of mobile devices; the second mobile device is configured to analyze the second set of private data, wherein the second set of private data is intended for the second mobile device and the second set of private data is received via the second wireless network; the second mobile device is configured to determine that the second set of private data is not to be shared with the plurality of mobile devices; and the second mobile device is configured to transmit the second set of shared data via the second communication technique to other mobile devices of the plurality of mobile devices.

DETAILED DESCRIPTION

Figure 1:
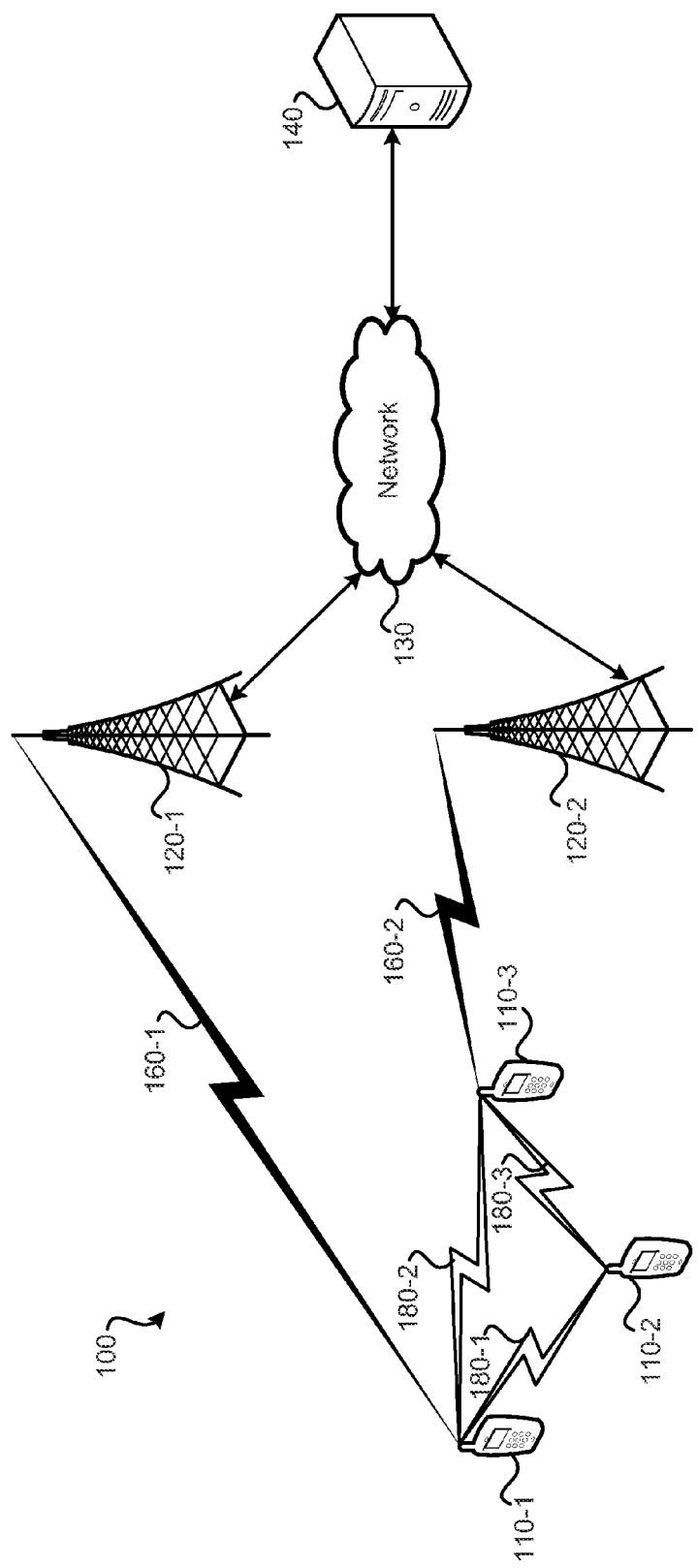
FIG. 1 is a schematic diagram of a cooperative data transport system.

An application running on a first mobile device (e.g., a cellular phone, smart phone, tablet computer, laptop) may use some or all of the same data as an application (likely the same application) running on a second mobile device in proximity to the first mobile device. As an example, two or more users near each other may be playing a multiplayer video game with each other. To function, the application uses information to be exchanged between each mobile device and a remote computer system, such as a game server. Conventionally, in order to exchange data between the application running on each mobile device and the remote computer system, data is transmitted from the remote computer system via a network, such as the Internet, to a wireless cellular network providing service to each mobile device. The data is then transmitted by the wireless cellular network to the associated mobile device. Data can be transmitted from each mobile device to the remote server via the reverse route.

In some circumstances, such as a multiplayer game being played by two users using two mobile devices, applications running on each mobile device use at least some of the same data. For instance, during gameplay a common soundtrack can be played by the application running on each of the mobile devices. Conventionally, this common soundtrack data would be transmitted twice by the remote server: once to each mobile device participating in the game. Therefore, even though the data is identical (or nearly identical), the mobile device the data is destined for is different and, therefore, the common data is transmitted twice by the remote computer system over the one or more networks serving to connect the remote computer system with each mobile device. If more than two mobile devices are participating in the game, the identical data would be transmitted additional times.

Rather than having this common data transmitted multiple times, the data can be indicated as "shared" data and transmitted by the remote computer system to only one of the mobile devices. The mobile device that has received the shared data can re-transmit the shared data to the other participating mobile devices using a different network, such as a local wireless network, than that used to provide the data to the re-transmitting mobile device. For instance, the shared data can be received by a first mobile device from the remote computer system via a 3G cellular network that has limited bandwidth and/or requires the user of the first mobile device to pay for network access. Following receiving the shared data, the first mobile device transmits the shared data via a local wireless network, such as a WiFi network (e.g., 702.11 (a)/(b)/(g)/(n)) Bluetooth, or WiFi Direct, to the other participating mobile devices. This local wireless network may have greater available bandwidth and/or may not require the user to pay for access.

In a situation where each mobile device is in communication via a local wireless network and is also in communication with another wireless network, such as a cellular wireless network, shared data transmitted by the remote server may be transmitted to only one of the mobile devices or may be split among several of the mobile devices. For instance, if each mobile device of a group of three mobile devices in physical proximity to each other participating in a multi-player game uses a cellular network that provides a similar amount of bandwidth, one-third of the shared data may be transmitted to each mobile device, with each mobile device being responsible for transmitting its received shared data to the other mobile devices via a local wireless network. As such, the remote computer system does not transmit duplicate data and each mobile device receives and distributes a portion of the shared data, thus reducing the cellular network bandwidth used by each mobile device.

While some data transmitted between the remote computer system and the mobile devices is shared, some data is used by only one of the mobile devices. Consider again the example of a multiplayer video game: while a common soundtrack can be shared among all participating mobile devices, data related to images depicting the location of a user's character on his mobile device might only be used by that particular user's mobile device. As such, this "private" data, that is, data used by only a particular mobile device, may be marked private and transmitted directly to the associated mobile device via the cellular wireless network. As such, each mobile device would exchange shared data using the local wireless network, but would receive private data individually.

In some situations, such as when a particular mobile device has a low bandwidth connection with a cellular network, the mobile device may not be able to receive all (or any) of its associated private data. In such a circumstance, the private data destined for the low-bandwidth mobile device can be routed to another mobile device participating in the multi-user application, with the private data transmitted to the low-bandwidth mobile device via the local wireless network. Such a configuration can permit a mobile device to utilize a multi-user application in proximity with other participating mobile devices even if the mobile device cannot connect with the remote computer system via a cellular network.

Configurations where shared data is exchanged using a network separate from a network used to communicate with a remote computer system may be referred to as a cooperative data transport system. FIG. 1 illustrates a cooperative data transport system 100. Cooperative data transport system 100 includes: mobile devices 110, cellular networks 120, network 130, and remote computer system 140. Mobile devices 110, which include mobile devices 110-1, 110-2, and 110-3, may each communicate using at least two different networks. For instance, mobile device 110-1 communicates wirelessly with cellular (wireless) network 120-1 (represented in FIG. 1 by a base station). Wireless cellular connection 160-1 between mobile device 110-1 and cellular network 120-1 can use a 2G, 3G, or 4G protocol, such as LTE (Long Term Evolution). Mobile device 110-1 can also communicate using wireless network connections 180-1 and 180-2 with mobile devices 110-2 and 110-3 while these mobile devices are in physical proximity. Local wireless network connections 180 may refer to a wireless communication technique between two or more mobile devices. Local wireless network connections 180-1 and 180-2 may utilize a protocol such as WiFi Direct, Bluetooth, ultrawide band, or an 802.11(a)/(b)/(g)/(n) WiFi network. Being in physical proximity refers to mobile devices 110 being close enough together that mobile devices 110 can communicate with each other using local wireless network connections 180. As such, in cooperative data transport system 100 at least two different networks are used: a first network, here a cellular network is used to communicate with remote computer system 140, and a second network, such as a local wireless network, to share data among mobile devices 110. Further, mobile devices that communicate using a local wireless network connection and a wireless cellular network can have at least two wireless communication interfaces: one for communication with the wireless cellular network and one for communication with the local wireless network.

Mobile device 110-3 is in communication with cellular network 120-2 via wireless cellular connection 160-2. Cellular network 120-2 can represent the same or a different cellular network from cellular network 120-1. While illustrated separately, if mobile devices 110-1 and 110-3 are in physical proximity and utilize the same cellular network, cellular network 120-2 and 120-1 can be the same cellular network. Mobile device 110-3 communicates with cellular network 120-2 via wireless cellular connection 160-2. Wireless cellular connection 160-2 can utilize the same protocol or a protocol different from wireless cellular connection 160-1. For instance, wireless cellular connection 160-1 can be a 4G LTE connection having greater bandwidth than wireless cellular connection 160-2, if wireless cellular connection 160-2 is a 3G connection. Mobile device 110-3 also communicates using local wireless network connections 180-2 and 180-3 with mobile devices 110-1 and 110-2, respectively. For example, a peer-to-peer application can be used to exchange data between mobile devices, using wireless protocols such as WiFi Direct or Bluetooth. One of the mobile devices may serve as an access point for the other mobile devices.

Mobile device 110-2 is in communication with mobile devices 110-1 and 110-3 via local wireless network connections 180-1 and 180-3, respectively. Mobile device 110-2 is not in communication with a cellular network. This can be for several reasons, such as: mobile device 110-2 is not capable of communicating with a cellular network, the user has specified that mobile device 110-2 is not to communicate with a cellular network, the cellular radio of mobile device 110-2 is disabled, and/or the battery of mobile device 110-2 has too little stored energy to communicate with a cellular network.

Cellular networks 120 are in communication with network 130. Network 130 can be one or more public and/or private networks. For example, network 130 can be the Internet. Remote computer system 140 is in communication with network 130. Data is routed by remote computer system 140, through network 130 and cellular networks 120 to mobile devices 110-1 and 110-2.

While cooperative data transport system 100 illustrates cellular networks 120 and local wireless network connections 180, in some configurations wired networks are used. For example, devices may be wired to a cable-based network, fiber-based network, or DSL-based network and communicate with network 130. Similarly, in some configurations, devices communicate using a wired local network, such as a local area network, to communicate with each other. Also, besides mobile devices, some configurations utilize computerized devices that are not mobile, such as servers, desktop computers, internet-enabled BLURAY players, internet-enabled televisions, and console gaming systems. Further, in some configurations, some devices may be mobile devices while other devices are not mobile. Further, other configurations may include fewer or greater numbers of mobile devices. For example, some configurations contain two mobile devices, while other configurations contain four, five, six, ten, or more mobile devices.

Figure 2:
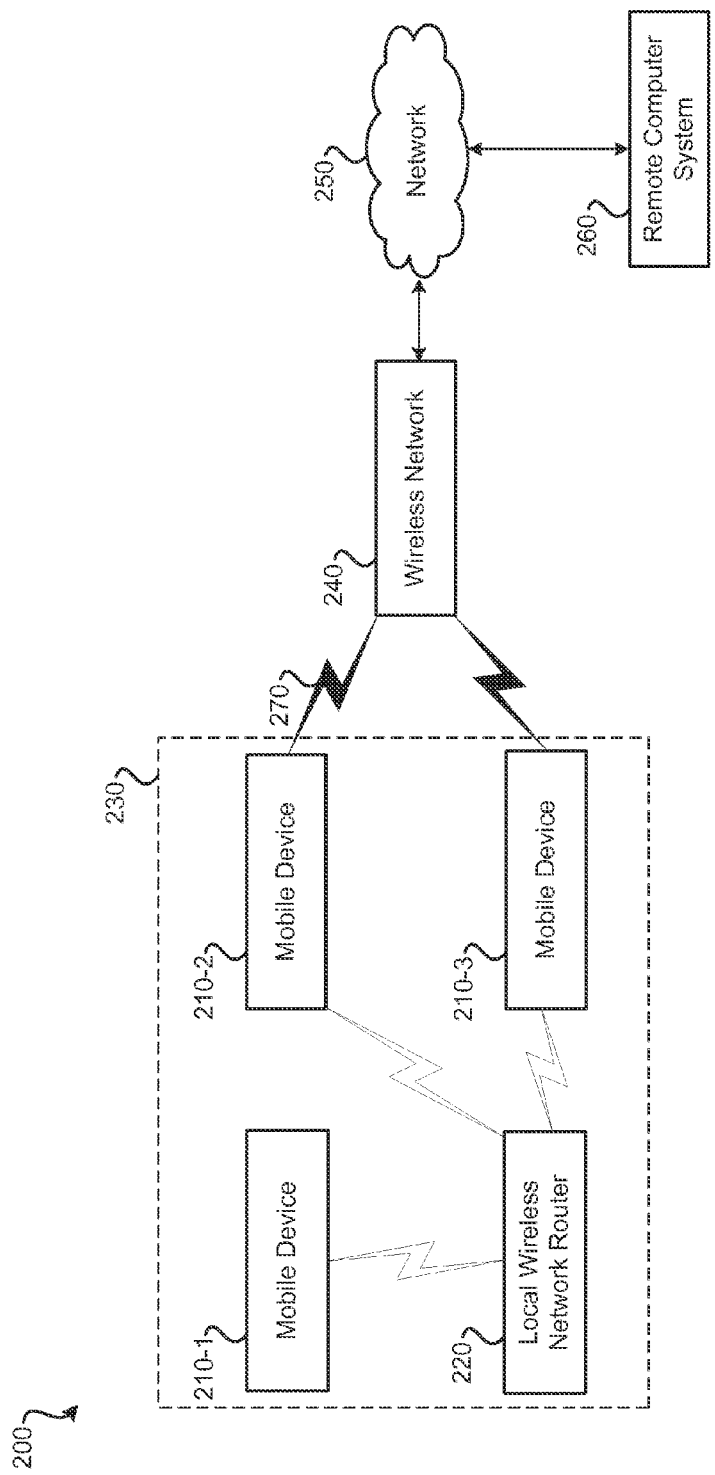
FIG. 2 is a schematic diagram of another cooperative data transport system.

FIG. 2 illustrates a cooperative data transport system 200. Cooperative data transport system 200 includes: mobile devices 210, local wireless network router 220, wireless network 240, network 250, and remote computer system 260. While mobile devices of cooperative data transport system 100 of FIG. 1 communicate directly with each other, mobile devices 210 of FIG. 2 communicate with each other via local wireless network router 220. For example, if a local wireless protocol of 802.11(a)/(b)/(g)/(n) is used, local wireless network router 220 routes data transferred between mobile devices 210. As such, to use local wireless network 230, mobile devices 210 are within sufficient physical proximity of local wireless network router 220 to communicate wirelessly.

In cooperative data transport system 200, mobile devices 210-2 and 210-3 communicate with another wireless network 240, which can be a cellular wireless network. In some configurations, the bandwidth available between wireless network 240 and mobile devices 210-2 and 210-3 is less than the bandwidth available between mobile devices 210 via local wireless network 230. In cooperative data transport system 200, mobile devices 210-2 and 210-3 communicate with the same wireless network. As such, mobile devices 210-2 and 210-3 can have similar amounts of bandwidth available with wireless network 240. In some configurations, mobile devices 210-2 and 210-3 can have different amounts of bandwidth available with wireless network 240 (due to such factors as strength of signal, amount of bandwidth purchased, etc.).

Wireless network 240 communicates with network 250. Network 250 can represent a private or public network, such as the Internet. Remote computer system 260, which exchanges data with mobile devices 210, is in communication with network 250. Remote computer system 260 can be a server that acts as a host for a shared application (e.g., game, streaming music/video application, quiz application, census program) being run by mobile devices 210.

Data transmitted by remote computer system 260 to mobile devices 210-2 and 210-3 can be labeled either public or private. The data can be indicated as either public or private using a flag in the data. Data labeled private is intended for the mobile device indicated by the IP address associated with the data. Data labeled shared is intended for each of the mobile devices participating in the shared application. When mobile device 210-2 receives a set of shared data via wireless connection 270 with wireless network 240, mobile device 210-2 can transmit the set of shared data to mobile devices 210-1 and 210-3 using local wireless network 230. Similarly, when mobile device 210-3 receives a set of shared data from remote computer system 260 via wireless network 240, mobile device 210-3 transmits the shared set of data to mobile devices 210-1 and 210-2 using local wireless network 230.

As an example, if a total of one megabyte of shared data is to be transmitted to mobile devices 210 by remote computer system 260, remote computer system can transmit 0.5 megabytes to mobile device 210-3 and 0.5 megabytes to mobile device 210-2. Mobile devices 210-2 and 210-3 would then transmit their received portions of the shared data to each other mobile device of mobile devices 210. As such, a total of one megabyte of data would be transmitted to mobile devices 210-2 and 210-3 via wireless network 240, as opposed to a situation where the data is transmitted to each mobile device individually by wireless network 240, which would result in three megabytes of data being transmitted by wireless network 240.

In some configurations, mobile devices 210 can share information regarding characteristics of their connections with remote computer system 260. For example, mobile device 210-1 could transmit an indication to mobile devices 210-2 and 210-3 that it does not have a connection via wireless network 240 (or any other wireless network) with remote computer system 260. Mobile device 210-2 could transmit an indication to mobile devices 210-1 and 210-3 that it has a 300 kbps connection with remote computer system 260 via wireless network 240. Mobile device 210-3 could transmit an indication to mobile devices 210-1 and 210-2 that it has a 600 kbps connection with remote computer system 260 via wireless network 240. An indication of these connection speeds (such as a ratio) can be transmitted to remote computer system 260 by one (or each) of mobile devices 210. In this example, because mobile device 210-3 has a faster connection with remote computer system 260, a larger portion of the shared data is transmitted by remote computer system 260 to mobile device 210-3 than to mobile device 210-2. In some configurations, a master mobile device is responsible for receiving indications of the connection speed of each mobile device of mobile devices 210 and transmitting an indication of the connection speeds to remote computer system 260. These speeds can be periodically re-measured and used to update how private and shared data is distributed.

Remote computer system 260 can receive an indication from mobile device 210-2 indicating its IP address. Mobile device 210-2 can also provide remote computer system 260 with an indication of an IP address maintained by mobile device 210-2 but linked to mobile device 210-1. As such, data received by mobile device 210-2 from wireless network 240 via wireless connection 270 associated with the IP address linked to mobile device 210-1 would be routed by mobile device 210-2 to mobile device 210-1 via local wireless network 230. As such, private data received by mobile device 210-2 intended for mobile device 210-1 can be identified at the IP layer and routed appropriately. Similarly, mobile device 210-3 can have an IP address for itself and an IP address for mobile device 210-1. An indication of each IP address and its linked mobile device can be transmitted to remote computer system 260. As such, private data for mobile device 210-1 can be transmitted to mobile device 210-3. When received by mobile device 210-3, based on the IP address, mobile device 210-3 would route the private data to mobile device 210-1 via local wireless network 230.

In some configurations, each mobile device connected with remote computer system 260 through a wireless network (such as wireless network 240) has an IP address for each mobile device participating in the shared application. In some configurations of cooperative data transport system 200, mobile device 210-2 would have three IP addresses: an IP address for itself, mobile device 210-1, and mobile device 210-3. Similarly, mobile device 210-3 would have an IP address for itself, mobile device 210-1, and mobile device 210-2. Remote computer system 260 would either receive an indication of each group of IP addresses from mobile devices 210-2 and 210-3 or from a single master mobile device. As such, using the various IP addresses, remote computer system 260 can route private data for each of mobile devices 210 to either mobile device 210-2 or mobile device 210-3. Based on the linked IP address, the private data is either maintained as private by the receiving mobile device or retransmitted via local wireless network 230 to the appropriate mobile device of mobile devices 210.

While the illustrated embodiment of cooperative data transport system 200 only uses wireless network 240, different wireless networks can be used by mobile devices. For example, mobile device 210-3 could communicate with network 250 using a different wireless network. Because the remote computer system 260 determines to which IP address shared and private data is transmitted, whether one or more than one wireless network is used may not affect operation of cooperative data transport system 200. Further, while mobile device 210-1 of cooperative data transport system 200 does not have a wireless connection with wireless network 240, in other configurations it can be connected with wireless network 240 or some other wireless network.

In some configurations of cooperative data transport system 200, wired networks are used. For example, devices may be wired to a cable-based network, fiber-based network, or DSL-based network and communicate with network 130. Similarly, in some configurations, devices communicate using a wired local network, such as a local area network. Also, besides mobile devices, some configurations utilize computerized devices that are not mobile, such as servers, desktop computers, internet-enabled BLURAY players, internet-enabled televisions, and/or console gaming systems. Further, in some configurations, some devices may be mobile devices while other devices are not mobile. Moreover, other configurations may include fewer or greater numbers of mobile devices. For example, some configurations contain two mobile devices, while other configurations contain four, five, six, ten, or more mobile devices.

Figure 3:
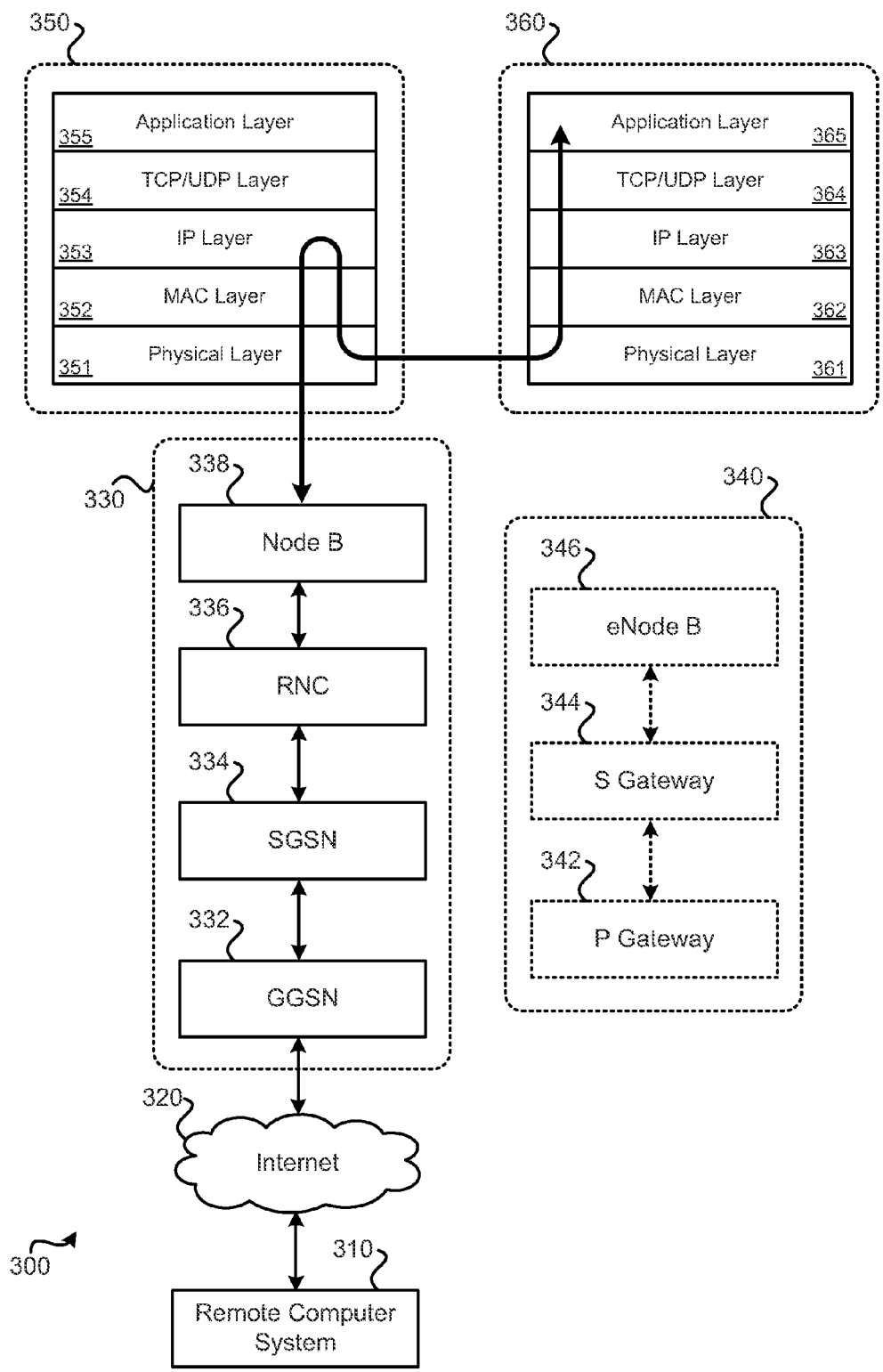
FIG. 3 is a block diagram of a cooperative data transport system with various communication system layers.

FIG. 3 illustrates a cooperative data transport system 300 with various communication system layers. Cooperative data transport system 300 can be cooperative data transport system 200 of FIG. 2, cooperative data transport system 100 of FIG. 1, or some other cooperative data transport system. Cooperative data transport system 300 contains mobile device 350 and mobile device 360. Remote computer system 310 communicates with cellular network 330 via the Internet 320. Cellular network 330 includes various components: GGSN (Gateway GPRS Support Node, wherein GPRS stands for General Packet Radio Service) 332, SGSN (Serving GPRS Support Node) 334, RNC (Radio Network Controller) 336, and Node B 338. GGSN 332 serves as an interface between cellular network 330 and external packet switched networks, such as Internet 320. SGSN 334 routes data packets to various radio network controllers, including RNC 336, residing within a geographical area. RNC 336 manages wireless resources, handles encryption, and controls one or more Node B's, including Node B 338. Node B 338 communicates wirelessly with mobile devices, including mobile device 350. Cellular network 330 is a 3G network using the UMTS (Universal Mobile Telecommunications System) technology.

Other cellular system technologies are also possible. For example, in some configurations, rather than using cellular network 330, cellular network 340 is used. Cellular network 340 represents a 4G LTE (Long Term Evolution) network. Cellular network 340 includes: P-Gateway (Packet Data Node Gateway) 342, S-Gateway (Serving Gateway) 344, and eNode B 346. P-Gateway 342 serves as an interface between cellular network 340 and external packet switched networks, such as Internet 320. S-Gateway 344 serves as an interface between P-Gateway 342 and multiple eNode B's, including eNode B 346. eNode B 346 combines functionality of the Node B 338 and RNC 336. eNode B 346 communicates wirelessly with mobile devices, such as mobile device 350. In some configurations of a cooperative data transport system, one or more mobile devices communicate with a 3G cellular network (such as cellular network 330) and other mobile devices communicate with a 4G cellular network (such as cellular network 340).

The communication system of mobile devices, such as mobile devices 350 and 360, can be sub-divided into various layers according to the OSI (Open Systems Interconnection) Model. Mobile device 350 includes: physical layer 351, MAC (Media Access Control) layer 352, IP (Internet Protocol) layer 353, MPTCP/TCP/UDP (Multi-Path Transmission Control Protocol/Transmission Control Protocol/User Datagram Protocol) layer 354, and application layer 355. Similarly mobile device 360 includes: physical layer 361, MAC layer 362, IP layer 363, MPTCP/TCP/UDP layer 364, and application layer 365. In some aspects, the MPTCP/TCP/UDP layer 364 on mobile device 360 can comprise a multipath transport layer such as MPTCP that utilizes multiple IP addresses of mobile devices 350 and 360 to set up a multipath transport connection. In some aspects, the mobile device 360 may directly use the IP address of mobile device 350. A network address translation may be required between the IP address associated with mobile device 350 that is used by mobile device 360, and the IP address of mobile device 350. For example, mobile device 350 can serve as an access point to mobile device 360, so that such a network address translation is needed. When using a multipath transport connection, a redistribution of data between mobile devices 360 and 350 may be needed over local wireless networks for data received at mobile device 360 through the multipath transport connection. In some aspects, only shared data may be communicated between the remote computer system 310 and the mobile device via a multipath transport connection, whereas private data may be directly communicated to respective mobile devices through alternate flows. If private data is also communicated via a multipath transport connection, then it may be in encrypted form when it flows through the mobile device 360.

Cooperative data transport system 300 presents a situation where a private set of data is being received by mobile device 350 and routed to mobile device 360. Referring to cooperative data transport system 100 of FIG. 1, cooperative data transport system 300 can represent a situation where remote computer system 140 is routing a set of private data to mobile device 110-2 via wireless network 120-1 via mobile device 110-1. Similarly, referring to cooperative data transport system 200 of FIG. 2, remote computer system 260 can be routing private data to mobile device 210-1 or mobile device 210-3 via mobile device 210-2 and local wireless network 230. In cooperative data transport system 300 of FIG. 3, a set of private data is transmitted by the remote computer system 310. This set of private data is associated with an IP address held by mobile device 350. This IP address, while held by mobile device 350, is linked to mobile device 360.

The set of private data transmitted by remote computer system 310 contains an IP address that is maintained by mobile device 350, but linked to mobile device 360. The set of private data is routed over Internet 320 to cellular network 330 (or 340). Cellular network 330 (or 340) transmits the private data packet to mobile device 350. At IP layer 353, mobile device 350 identifies that the private data packet is associated with an IP address linked to mobile device 360. In some configurations, rather than data packets being identified as intended for another mobile device (or not intended for one or more additional mobile devices) at IP layer 353, the determination may occur at either application layer 355 or MPTCP/TCP/UDP layer 354. The private data is transmitted via a local wireless network to mobile device 360. Mobile device 360 then processes the private data. The routing of the set of private data routed by cellular network 330 to mobile device 360 via mobile device 350 and the local wireless network is depicted by the bold arrow.

Data to be transmitted by mobile device 360 to remote computer system 310 can be transmitted via the reverse route. Data intended for remote computer system 310 is transmitted by mobile device 360 via local wireless network to mobile device 350. At IP layer 353, the data is identified as intended for remote computer system 310. Mobile device 350 transmits the data via cellular network 330 (or 340) to remote computer system 310.

If shared data is transmitted by remote computer system 310 to mobile device 350, the shared data may be identified at application layer 355 of mobile device 350. The shared data could be transmitted via the local wireless network to mobile device 360 (and any other mobile devices participating in the shared application). In some configurations, mobile device 350 can maintain an additional IP address for shared data, of which remote computer system 310 is aware. Data addressed by remote computer system 310 for this IP address is known by mobile device 350 to be shared. As such, the shared data is intercepted at the IP layer and distributed to other mobile devices participating in the shared application.

If the data transmitted by remote computer system 310 is private data intended for mobile device 350, the private data would be associated with an IP address linked to mobile device 350. Mobile device 350 would receive and process the private data, with no indication of the private data transmitted to mobile device 360. If mobile device 360 is connected to cellular network 330 (or 340), private data for mobile device 360 can be transmitted to mobile device 360 by cellular network 330 (or 340) rather than routed to mobile device 360 via mobile device 350 and the local wireless network.

Figure 4:
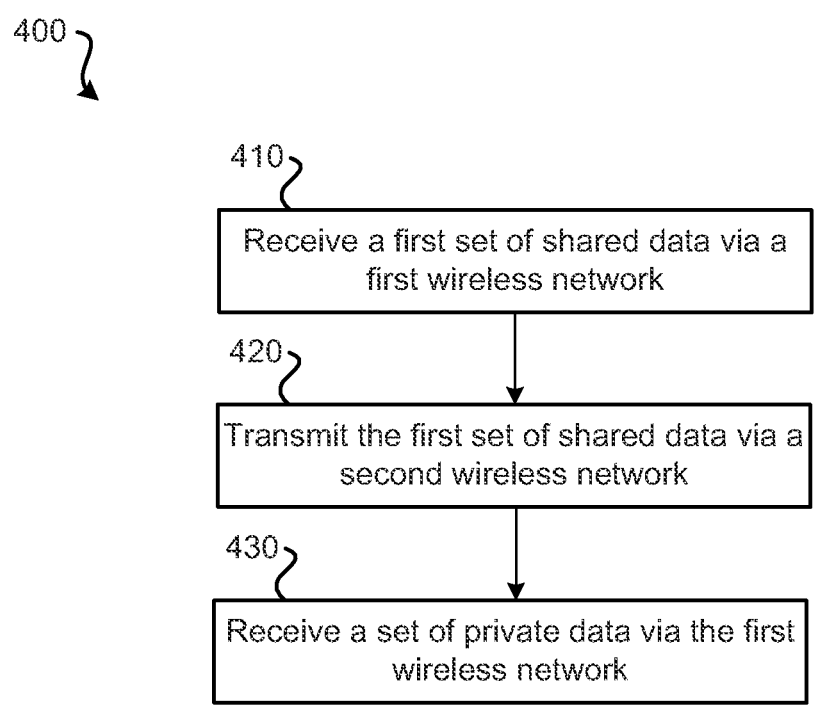
FIG. 4 is a block flow diagram of a method for handling data by a device of a cooperative data transport system.

Various methods can be performed using the cooperative data transport systems of FIGS. 1-3. FIG. 4 illustrates a method 400 for handling data by a device (such as a mobile device) of a cooperative data transport system. Method 400 can be performed by a cooperative data transport system, such as cooperative data transport system 100 of FIG. 1, cooperative data transport system 200 of FIG. 2, cooperative data transport system 300 of FIG. 3, or some other cooperative data transport system. At stage 410, a device, such as a mobile device, receives a first set of data via a first wireless network. This first wireless network can be a cellular network.

At stage 420, the first set of data that is determined to be shared data is transmitted to other mobile devices participating in a shared application with the mobile device using a second wireless network, which can be a local wireless network. An indication, such as a flag, can be present in the first set of data that indicates that it is shared data. In some configurations, the IP address indicates that the data is shared data.

At stage 430, a set of private data intended for the first mobile device is received by the mobile device via the first wireless network. The set of private data is determined to be intended for the mobile device based on the IP address associated with the private data. Because the set of data is private, the mobile device does not transmit the set of private data to other mobile devices.

Figure 5:
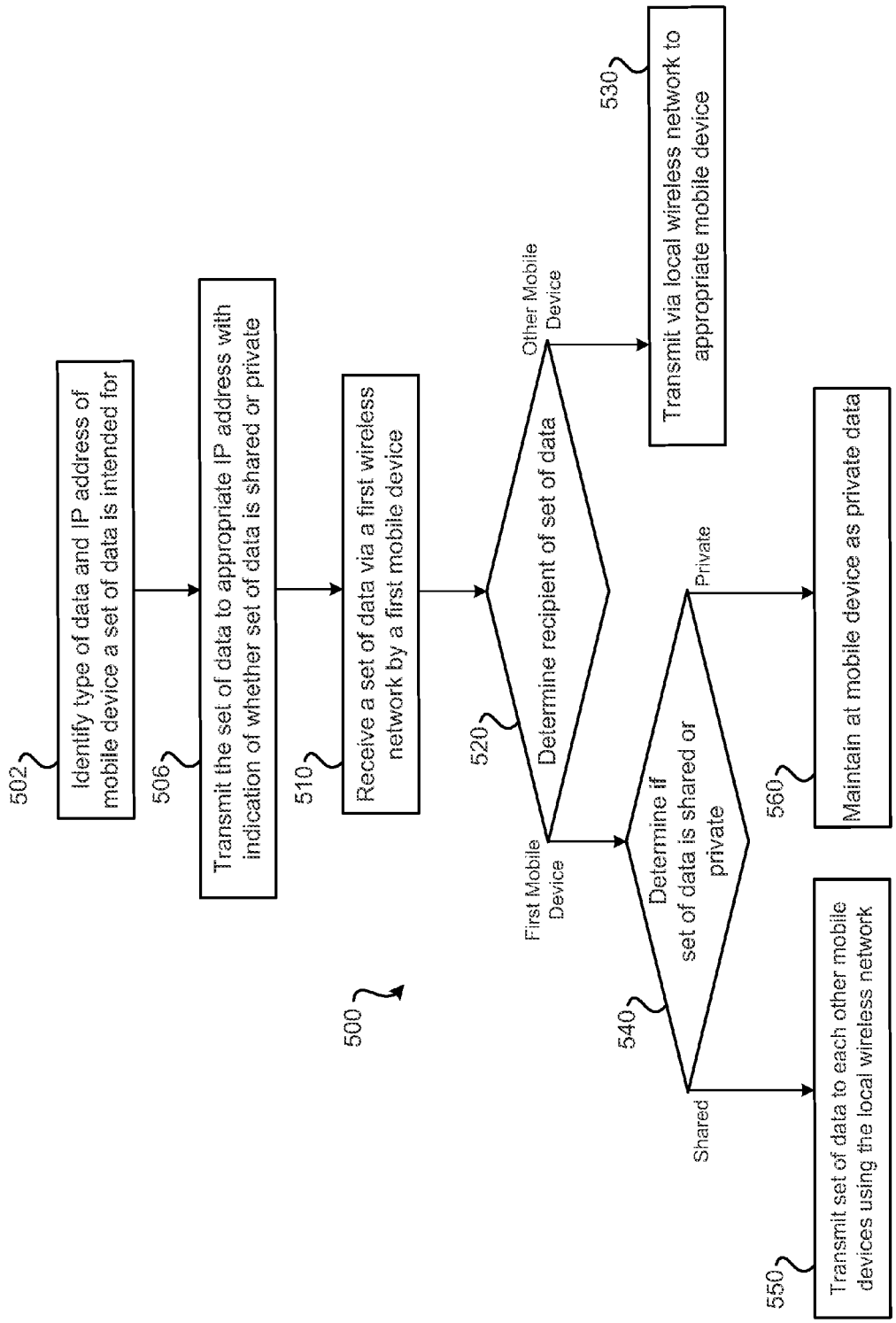
FIG. 5 is a block flow diagram of another method for handling data by a device of a cooperative data transport system.

FIG. 5 illustrates a method 500 for handling data by a device of a cooperative data transport system. Method 500 can be performed by a cooperative data transport system, such as cooperative data transport system 100 of FIG. 1, cooperative data transport system 200 of FIG. 2, cooperative data transport system 300 of FIG. 3, or some other cooperative data transport system. In method 500, at least two mobile devices are located in physical proximity to each other and can communicate with each other using a local wireless network, using a protocol such as WiFi, WiFi Direct, or Bluetooth.

At stage 502, the remote computer system, which can be a game server, identifies whether a set of data is private data intended for one mobile device or shared data intended for all mobile devices participating in a shared application, such as a game. The remote computer system also identifies the mobile device the data should be routed to and its IP address. At stage 506, the set of data is transmitted to the appropriate IP address with an indication of whether the set of data is shared or private. In some configurations, the IP address can be used to indicate whether the set of data is shared or private. For example, a particular IP address linked to a mobile device may be used to receive only shared data. Therefore, if a set of data is received from the remote computer system using that IP address, the mobile device is configured to distribute the set of data to other mobile devices participating in the shared application.

At stage 510, a set of data is received via a first network, such as a cellular network, by the mobile device (referred to as the first mobile device) indicated by the IP address linked to the set of data. At stage 520, the mobile device that is the intended recipient of a set of data transmitted by a remote computer system is determined. The first mobile device can have multiple IP addressed linked to it. One of these IP addresses can be used for data intended for the first mobile device. Other IP addresses can be used for data intended for other mobile devices. As such, based on which IP address is indicated in a set of data, the mobile device that is the intended recipient can be determined by the first mobile device. If the IP address indicates that some other mobile device is the intended recipient of the set of data (such as if the set of data is a set of private data intended for only some other mobile device), the set of data is transmitted using a local wireless network, separate from the first network, to the appropriate mobile device at stage 530.

If, at stage 520, as indicated by the IP address of the set of data, the set of data is intended for the first mobile device, stage 540 is performed. At stage 540, it is determined if the set of data is shared data or private data. A flag can be present in the set of data that indicates whether the set of data is shared data or private data. If the set of data is private, at stage 560 the mobile device does not transmit the set of data to other mobile devices. The set of data is used by only the first mobile device. However, if at stage 540, the set of data is determined to be a shared set of data, at stage 550, the shared set of data is transmitted to each other mobile device using the local wireless network that is participating in the shared application.

In some configurations, stages 520 and 540 are combined. In these configurations, the IP address is used to determine the recipient of the set of data and whether the set of data is shared or private. For example, a mobile device could have three IP addresses: one IP address for private data intended for itself; one IP address for private data intended for some other mobile device; and one IP address for data to be shared with other mobile devices.

While a local wireless network is discussed as being used to communicate between the mobile devices, other networks can also be possible. For example, a satellite network could be used. If wired, the mobile devices could communicate using a local area, cable, fiber, or DSL network.

Figure 6:
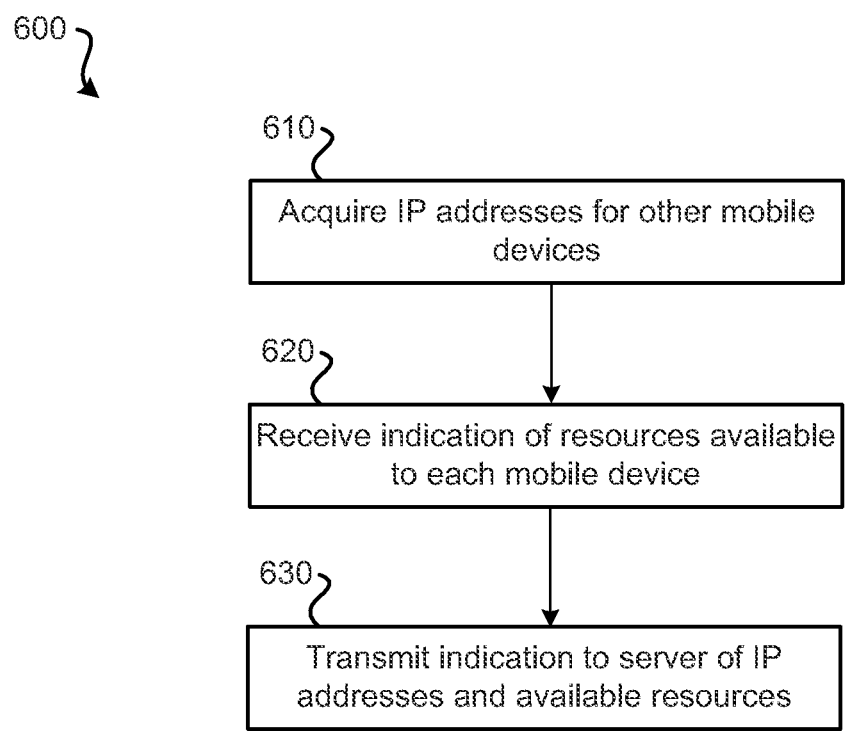
FIG. 6 is a block flow diagram of a method for providing a remote computer system with an indication of the characteristics of a cooperative data transport system.

FIG. 6 illustrates a method 600 for providing a remote computer system with an indication of the characteristics of a cooperative data transport system. Method 600 can be performed by a mobile device of a cooperative data transport system, such as cooperative data transport system 100 of FIG. 1, cooperative data transport system 200 of FIG. 2, cooperative data transport system 300 of FIG. 3, or some other cooperative data transport system. At stage 610, a mobile device can acquire an IP address for itself. It can also acquire IP addresses for one or more other mobile devices. In some configurations, the mobile device can acquire an IP address associated with each other mobile device participating in a shared application. As such, when sets of data are routed to a particular IP address, the mobile device can route the set of data to the appropriate mobile device. In some configurations, the mobile device can also acquire an IP address that is associated with only shared data.

At stage 620, the mobile device can receive an indication of the wireless resources available to each mobile device. Each mobile device participating in a shared application can transmit, via a local wireless network, an indication to the mobile device of whether it has a connection via another network, such as a cellular network, with the remote computer system. If such a connection is present, an indication of the speed and/or latency of the connection can be included. The mobile device receiving this connection information can determine which mobile devices should receive their own private data directly, which mobile devices should receive private data for other mobile devices, and how shared data should be proportionally routed to the mobile devices via wireless networks from the remote computer system. The mobile device that determines these factors can be referred to as the master mobile device. This mobile device can also receive an indication of the IP addresses acquired by other mobile devices and what those IP addresses are linked to (e.g., a shared data IP address, private data intended for some other mobile device, private data intended for the mobile device maintaining the IP address). At stage 630, information regarding the ratio of how shared data should be distributed, how private data should be distributed, and/or which IP addresses are associated with which mobile devices is transmitted to the remote computer system.

In some configurations, the indications of whether a connection is present, the speed, and/or the latency are transmitted to the remote computer system. From these indications, the remote computer system determines the ratio of distribution of shared and/or private data being transmitted to mobile devices.

To determine how the shared and/or private data is distributed to mobile devices, the following formulas can be used. The following formulas use an example of three mobile devices in physical proximity participating in a shared application. These formulas can be adapted for two, four, or more than four mobile devices.

Let S represent the shared data bandwidth required for each mobile device, let P represent the private data for each mobile device, and let W represent the total bandwidth of each mobile device available between the mobile device and the remote server. As such the total bandwidth for each mobile device is represented according to equations 1-3.

$$W_1 = S_1 + P_1 \qquad \text{Eq. 1}$$

$$W_2 = S_2 + P_2 \qquad \text{Eq. 2}$$

$$W_3 = S_3 + P_3 \qquad \text{Eq. 3}$$

The total traffic from the remote computer system to the mobile devices can be split according to the ratio of equation 4.

$$W_1 : W_2 : W_3 \qquad \text{Eq. 4}$$

If $W_i > P_i$, for each mobile device, the private data can be transmitted directly from the remote computer system to each respective mobile device without using the local wireless network. The shared data can be split for transmission by the remote computer system according to equation 5.

$$(W_1 - P_1) : (W_2 - P_2) : (W_3 - P_3) \qquad \text{Eq. 5}$$

The shared data is then shared between the mobile devices using the local wireless network.

If $W_i < P_i$ is present for one (or more than one) of the mobile devices (e.g., a low bandwidth connection with the remote computer system or no connection with the remote computer system), all shared data would be received by the low bandwidth mobile devices from another mobile device and some or all of its private data.

Gaming Example 1

As one type of application that may be participated in by several mobile devices (with associated users) consider a game that requires interaction with a game server (the remote computer system). Each of the participating mobile devices are in communication with each other via a local wireless network, such as an 802.11(g) network. All of these mobile devices communicate with the game server using another network, such as 3G or 4G cellular network.

Each of the mobile devices determines the speed and latency of their connections with the gaming server. This information is used by the game server (or the mobile devices) to determine how shared data should be distributed to mobile devices. For the remainder of this example, assume that each of the four mobile devices in physical proximity participating in the game are connected with the game server through various cellular networks: a first mobile device has a 200 kbps connection; a second mobile device has a 400 kbps connection; a third mobile device also has a 400 kbps connection; and a first mobile device has an 800 kbps connection. Private data for each mobile device is expected to consume approximately 100 kbps. Because each mobile device has a connection with the game server via a cellular network and sufficient bandwidth, all private data is transmitted directly to each mobile device without using the local wireless network. Shared data can be transferred to the mobile devices in a ratio according to the bandwidth available to each mobile device once the bandwidth has been discounted for private data transmissions, according to equation 5. Therefore, in this example, a ratio of 1:3:3:7 is present. As such for each seven sets of shared data transmitted to the fourth mobile device, three sets of shared data are transmitted to each of the second and third mobile devices, with one set transmitted to the first mobile device. Each of these sets of shared data can then be exchanged via the local wireless network.

Gaming Example 2

Consider another gaming example that requires interaction with a game server (the remote computer system). Again here, each of the participating mobile devices is in communication with the other via a local wireless network, such as an 802.11(g) network. In this example, only two of the three participating mobile devices are in communication with the game server via a cellular network connection.

The two mobile devices that have a connection with the gaming server determine the speed and latency of their connections with the gaming server. This information is used by the game server (or the mobile devices) to determine how shared data should be distributed to mobile devices. The two mobile devices that are connected with the game server through various cellular networks have speeds of 200 kbps and 400 kbps, respectively. Private data for each mobile device is expected to consume approximately 100 kbps. Because only two of the three mobile devices have a connection with the game server via a cellular network, private data for the third mobile device is transmitted via the other mobile devices. As such the first mobile device would devote 100 kbps to its own private data and 50 kbps to the third mobile device's private data. The first mobile device can have two IP addresses such that it can distinguish incoming data intended for the third mobile device from data intended for the first mobile device. Similarly, the second mobile device can devote 100 kbps to its private data and 50 kbps to the private data of the third mobile device. Again here, the second mobile device can have two IP address such that it can distinguish incoming data intended for the second mobile device from data intended for the third mobile device. The private data to be transferred to the third mobile device is transmitted by the first mobile device and the second mobile device via the local wireless network.

Once bandwidth has been devoted to private data, the first and second mobile devices have 50 kbps and 150 kbps remaining bandwidth. As such, shared data can be transmitted by the game server to the mobile devices in a ratio of 1:3.

The shared data received by the first and second mobile device is then transmitted to each other mobile device using the local wireless network. The ratio of how private and shared data are distributed can be periodically re-evaluated.

As a variation, instead of the private data for the third mobile device being split between the first mobile device and the second mobile device, the first mobile device could receive all of the third mobile device's private data and transmit it to the third mobile device via the local wireless network. In such a circumstance, the first mobile device may not have enough remaining bandwidth via its cellular connection to handle any shared data. As such, the second mobile device can receive all of the shared data and transmit it to each other mobile device via the local wireless network. As should be understood, other ways of distributing the private data and the shared data are possible.

Figure 7:
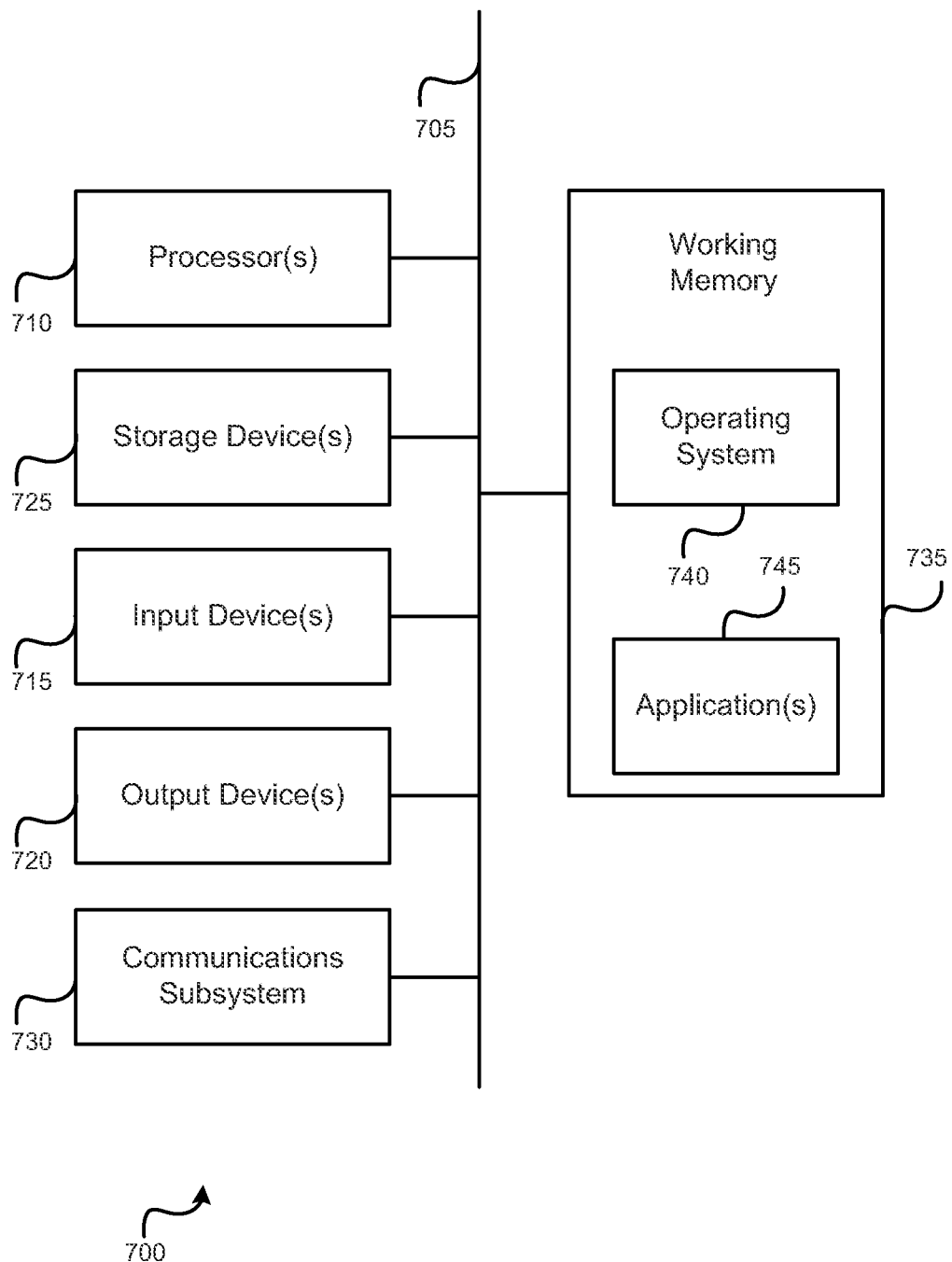
FIG. 7 is a block diagram of a computer system.

A computer system as illustrated in FIG. 7 may be incorporated as part of the previously described computerized devices. For example, computer system 700 can represent some of the components of the mobile devices and/or the remote computer systems discussed in this application. FIG. 7 provides a schematic illustration of one embodiment of a computer system 700 that can perform the methods provided by various other embodiments, as described herein, and/or can function as the host computer system, a remote kiosk/terminal, a point-of-sale device, a mobile device, and/or a computer system. FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard and/or the like; and one or more output devices 720, which can include without limitation a display device, a printer and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a non-transitory working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communications subsystem 730 (and/or the media by which the communications subsystem 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a non-transitory storage device 725 either before or after execution by the processor(s) 710.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A mobile device configured for cooperative data transport, the mobile device comprising:
 a processor, configured to:
  be in communication with at least one other mobile device;
  transmit an address via a first wireless network from the mobile device to an application server, the address identifying the at least one other mobile device;
  receive information indicative of a connection between the at least one other mobile device and the application server from the at least one other mobile device, wherein the connection uses a second wireless network different than the first wireless network, and wherein the information indicative of the connection between the at least one other mobile device and the application server comprises one or more of a speed of the connection or a latency of the connection;
  transmit the information indicative of the connection via the first wireless network from the mobile device to the application server;
  obtain mobile application data formed via execution of a mobile device application at an application level, the mobile device application being a multi-user application in which the mobile device and the at least one other mobile device are participating;
  transmit the mobile application data from the mobile device to the application server via the first wireless network;
  receive, via the first wireless network using a first communication technique, in response to the transmitted mobile application data, a first set of server application data generated by the application server executing a server application at the application level that is a cooperative counterpart to the mobile device application, the first set of server application data comprising content for use by the multi-user application on at least one of the mobile device and at least one of the at least one other mobile device, wherein:
the first set of server application data includes:
an indication of being private server application data so as to be intended for one of the mobile device or the at least one other mobile device; or
an indication of being shared server application data so as to be intended for both the mobile device and the at least one other mobile device; and
one or more of an address of the mobile device or the address identifying the at least one other mobile device;
determine whether the first set of server application data is private server application data or shared server application data;
determine a destination for the first set of server application data based on an address included in the first set of server application data; and
cause the first set of server application data to be transmitted via a second communication technique to the at least one other mobile device upon the first set of server application data being determined to be shared server application data or upon the first set of server application data being determined to be private server application data and the destination being determined to be the at least one other mobile device, wherein:
the first communication technique and the second communication technique are different communication techniques.

2. The mobile device configured for cooperative data transport of claim 1, wherein the first wireless network is a wireless cellular network and the second communication technique utilizes a local wireless network.

3. The mobile device configured for cooperative data transport of claim 1, wherein the processor is configured to analyze the first set of server application data at a layer selected from one or more of:
a MPTCP/TCP/UDP layer;
an IP layer; and
an application layer.

4. The mobile device configured for cooperative data transport of claim 1, wherein the mobile device utilizes an IP address of the at least one other mobile device.

5. The mobile device configured for cooperative data transport of claim 1, wherein the mobile device serves as a wireless access point for the at least one other mobile device.

6. The mobile device configured for cooperative data transport of claim 1, wherein the first set of server application data includes shared server application data that is communicated over a multipath transport connection between the application server and the mobile device, the multipath transport connection comprising a first path that utilizes the first communication technique and a second path via the at least one other mobile device that utilizes the second communication technique.

7. The mobile device configured for cooperative data transport of claim 1, wherein the first set of server application data includes private server application data that is communicated over a multipath transport connection between the application server and the mobile device, the multipath transport connection comprising a first path that utilizes the first communication technique and a second path via the at least one other mobile device that uses the second communication technique.

8. The mobile device configured for cooperative data transport of claim 1, wherein a second set of server application data intended for the at least one other mobile device is in an encrypted form when the second set of server application data is received by the mobile device.

9. The mobile device configured for cooperative data transport of claim 1, wherein the second communication technique comprises use of a local wireless protocol.

10. The mobile device configured for cooperative data transport of claim 1, wherein the mobile device comprises a cellular phone.

11. The mobile device configured for cooperative data transport of claim 1, wherein the mobile device further comprises:
a first wireless communication interface configured to communicate using the first communication technique; and
a second wireless communication interface configured to communicate using the second communication technique.

12. A method for cooperative data transport, the method comprising:
transmitting, by a first mobile device, an address via a first wireless network to an application server, the address identifying a second mobile device;
receiving, by the first mobile device, information indicative of a connection between the second mobile device and the application server from the second mobile device, wherein the connection uses a second wireless network different than the first wireless network, and wherein the information indicative of the connection between the second mobile device and the application server comprises one or more of a speed of the connection or a latency of the connection;
transmitting, by the first mobile device, the information indicative of the connection via the first wireless network to the application server;
obtaining, by the first mobile device, mobile application data formed via execution of a mobile device application at an application level, the mobile device application being a multi-user application in which the mobile device and the second mobile device are participating;
transmitting the mobile application data from the first mobile device to the application server via the first wireless network;
receiving, by the first mobile device, via the first wireless network, in response to transmitting the mobile application data, a first set of server application data generated by the application server executing a server application at the application level that is a cooperative counterpart to the mobile device application, the first set of server application data comprising content for use by the multi-user application on at least one of the mobile device and the second mobile device, wherein:
the first set of server application data includes:
an indication of being private server application data so as to be intended for one of the mobile device or the second mobile device; or
an indication of being shared server application data so as to be intended for both the mobile device and the second mobile device; and
one or more of an address of the first mobile device or the address identifying the second mobile device; and the first wireless network utilizes a first communication technique;

determining, by the first mobile device, whether the first set of server application data is private server application data or shared server application data;

determining, by the first mobile device, a destination for the first set of server application data based on an address included in the first set of server application data; and transmitting, by the first mobile device, via a second communication technique, the first set of server application data to the second mobile device upon determining that the first set of server application data is shared server application data or upon determining that the first set of server application data is private server application data and upon determining that the destination for the first set of server application data is the second mobile device, wherein:

the first communication technique and the second communication technique are separate communication techniques.

13. The method for cooperative data transport of claim 12, further comprising:

receiving, by the first mobile device, via the first wireless network, a second set of server application data, wherein the second set of server application data comprises an indication that the second set of server application data is intended for the second mobile device; and transmitting, by the first mobile device, via the second communication technique, the second set of server application data to the second mobile device.

14. The method for cooperative data transport of claim 12, wherein the first mobile device utilizes an IP address of the second mobile device.

15. The method for cooperative data transport of claim 12, wherein the first mobile device serves as a wireless access point for the second mobile device.

16. The method for cooperative data transport of claim 12, wherein the first set of server application data includes shared server application data that is communicated over a multipath transport connection between the application server and the first mobile device, the multipath transport connection comprising a first path via the first communication technique and a second path via the second communication technique.

17. The method for cooperative data transport of claim 12, wherein the first set of server application data includes private server application data that is communicated over a multipath transport connection between the application server and the first mobile device, the multipath transport connection comprising a first path via the first communication technique and a second path via the second mobile device and the second communication technique.

18. The method for cooperative data transport of claim 12, wherein a second set of server application data intended for the second mobile device is in an encrypted form when the second set of server application data is received by the first mobile device.

19. The method for cooperative data transport of claim 12, the method further comprising:

receiving, by the second mobile device, via the second wireless network, a second set of server application data, wherein the second set of server application data is to be shared among a plurality of mobile devices that includes the first mobile device and the second mobile device; and transmitting, by the second mobile device, via the second communication technique, the second set of shared server application data to each other mobile device of the plurality of mobile devices.

20. The method for cooperative data transport of claim 19, wherein a ratio of the size of the first set of server application data to the size of the second set of server application data is at least partially based upon a ratio of bandwidth between the first mobile device and the first wireless network and bandwidth between the second mobile device and the second wireless network.

21. The method for cooperative data transport of claim 12, wherein first wireless network is a wireless cellular network and the second communication technique utilizes a local wireless protocol.

22. The method for cooperative data transport of claim 12, wherein the second communication technique uses a local wireless network.

23. The method for cooperative data transport of claim 12, wherein cooperative data transport allows a game to be played between users operating the first mobile device and the second mobile device.

24. An apparatus for cooperative data transport, the apparatus comprising:

means for transmitting, by the apparatus, an address via a first wireless network to an application server, the address identifying at least one other apparatus;

means for receiving information indicative of a connection between the at least one other apparatus and the application server from the at least one other apparatus, wherein the connection uses a second wireless network different than the first wireless network, and wherein the information indicative of the connection between the at least one other apparatus and the application server comprises one or more of a speed of the connection or a latency of the connection;

means for transmitting the information indicative of the connection via the first wireless network from the apparatus to the application server;

means for obtaining, by the apparatus, apparatus application data formed via execution of an apparatus application at an application level, the apparatus application being a multi-user application in which the apparatus and the at least one other apparatus are participating;

means for transmitting the apparatus application data from the apparatus to the application server via the first wireless network;

means for receiving, via a first communication technique, by the apparatus, in response to transmitting the apparatus application data, a first set of server application data generated by the application server executing a server application at the application level that is a cooperative counterpart to the apparatus application, the first set of server application data comprising content for use by the multi-user application on at least one of the apparatus and the at least one other apparatus, wherein:

the first set of server application data includes:

an indication of being private server application data so as to be intended for one of the apparatus or the at least one other apparatus; or an indication of being shared server application data so as to be intended for both the apparatus and the at least one other apparatus; and one or more of an address of the apparatus or an address identifying the at least one other apparatus;

means for determining whether the first set of server application data is private server application data or shared server application data, wherein:
the first set of server application data being determined to be private server application data indicates that the first set of server application data is to be transmitted to one of the apparatus or the at least one other apparatus based on an address included in the first set of server application data; and
the first set of server application data being determined to be shared server application data indicates that the first set of server application data is to be transmitted to both the apparatus and the at least one other apparatus;
means for transmitting, via a second communication technique, the first set of server application data to the at least one other apparatus upon determining that the first set of server application data is shared server application data or upon determining that the first set of server application data is to be transmitted to the second mobile device, wherein:
the first communication technique and the second communication technique are separate communication techniques.

25. The apparatus for cooperative data transport of claim 24, wherein an amount of server application data received by the apparatus is at least partially based upon bandwidth between the apparatus and the first wireless network.

26. The apparatus for cooperative data transport of claim 24, wherein the apparatus utilizes an IP address of the at least one other apparatus.

27. The apparatus for cooperative data transport of claim 24, wherein the apparatus serves as a wireless access point for the at least one other apparatus.

28. The apparatus for cooperative data transport of claim 24, wherein the first wireless network is a wireless cellular network and the second communication technique uses a local wireless network.

29. The apparatus for cooperative data transport of claim 24, wherein:
the means for receiving is further configured for receiving, via the first communication technique, a second set of server application data, wherein the second set of server application data comprises an indication that the second set of server application data is intended for the at least one other apparatus; and
the means for transmitting is further configured for transmitting, via the second communication technique, the second set of server application data to the at least one other apparatus.

30. The apparatus for cooperative data transport of claim 24, wherein the apparatus allows a game to be played between a first user interacting with the apparatus and a second user interacting with the at least one other apparatus in communication with the apparatus via the second communication technique.

31. A computer program product residing on a non-transitory processor-readable medium and comprising processor-readable instructions configured to cause a processor to:
transmit an address via a first wireless network from a first mobile device to an application server, the address identifying a second mobile device;
receive, by the first mobile device, information indicative of a connection between the second mobile device and the application server from the second mobile device, wherein the connection uses a second wireless network different than the first wireless network, and wherein the information indicative of the connection between the second mobile device and the application server comprises one or more of a speed of the connection or a latency of the connection;
transmit, by the first mobile device, the information indicative of the connection via the first wireless network to the application server;
obtain, by the first mobile device, mobile application data formed via execution of a mobile device application at an application level, the mobile device application being a multi-user application in which the mobile device and the second mobile device are participating;
transmit the mobile application data from the first mobile device to the application server via the first wireless network;
receive, in response to the transmitted mobile application data, a first set of server application data that is generated by the application server executing a server application at the application level that is a cooperative counterpart to the mobile device application and that is received by the first mobile device via the first wireless network, the first set of server application data comprising content for use by the multi-user application on at least one of the mobile device and the second mobile device, wherein:
the first wireless network uses a first wireless technique;
the first set of server application data includes:
an indication of being private server application data so as to be intended for one of the first mobile device or the second mobile device; or
an indication of being shared server application data so as to be intended for each one of a plurality of mobile devices;
one or more of an address of the first mobile device or the address identifying the second mobile device; and
the plurality of mobile devices comprises the first mobile device and the second mobile device;
determine whether the first set of server application data is private server application data or shared server application data, wherein:
the first set of server application data being determined to be private server application data indicates that the first set of server application data is intended for one of the first mobile device or the second mobile device based on an address included in the first set of server application data; and
the first set of server application data being determined to be shared server application data indicates that the first set of server application data is intended for each of the plurality of mobile devices; and
cause the first set of server application data to be transmitted, via a second wireless technique, to the second mobile device upon determination that the first set of server application data is shared server application data or upon determination that the first set of server application data is intended to be transmitted to the second mobile device, wherein:
the first wireless technique and the second wireless technique are different wireless techniques.

32. The computer program product of claim 31, wherein an amount of server application data received by the processor is at least partially based upon a bandwidth between the first wireless network and the first mobile device.

33. The computer program product of claim 31, wherein the second wireless technique uses a local wireless protocol.

34. The computer program product of claim 31, further comprising instructions configured to cause the processor to:
receive a second set of server application data via the first wireless technique, wherein the second set of server application data comprises an indication that the second set of server application data is intended for the second mobile device; and
cause the second set of server application data to be transmitted, via the second wireless technique, to the second mobile device.

35. The computer program product of claim 31, wherein the computer program product functions in conjunction with a game to be played between a first user operating the first mobile device and a second user operating the second mobile device.

36. A system for cooperative data transport, the system comprising:
a computer system, configured to:
receive, an address from a first mobile device included in a plurality of mobile devices via a first wireless network, the address identifying at least one other mobile device included in the plurality of mobile devices;
receive, information indicative of a connection between the at least one other mobile device and the system from the first mobile device, wherein the connection uses a second wireless network different than the first wireless network and wherein the information indicative of the connection between the at least one other mobile device and the system comprises one or more of a speed of the connection or a latency of the connection;
receive, mobile application data from the first mobile device, the mobile application data being formed via execution of a mobile device application at an application level, the mobile device application being a multi-user application in which the first mobile device and the at least one other mobile device are participating;
execute, in response to receipt of the mobile application data, an application at an application level to generate a first set of server application data that is to be communicated to the first mobile device, the first set of server application data comprising content for use by the multi-user application on at least one of the first mobile device and the at least one other mobile device, wherein:
the first set of server application data includes:
an indication of being private server application data so as to be intended for one of the first mobile device or the at least one other mobile device; or
an indication of being shared server application data so as to be intended for each mobile device in the plurality of mobile devices;
transmit, via the first wireless network, the first set of server application data to the first mobile device, wherein:
the first set of server application data comprises the address from the first mobile device; and
the indication of being private server application data or the indication of being shared server application data and the address from the first mobile device are configured to be used by the first mobile device to determine one or more destinations for the first set of server application data.

37. The system of claim 36, wherein the computer system is further configured to:
select, from the plurality of mobile devices, the first mobile device to receive the first set of server application data at least partially based on a first amount of bandwidth between the first mobile device and the first wireless network compared with a second amount of bandwidth between the at least one other mobile device and the second wireless network.

38. The system of claim 36, wherein the computer system is further configured to:
execute the application to generate a second set of server application data that is intended for the at least one other mobile device and is to be transmitted to the first mobile device; and
transmit the second set of server application data to the first mobile device.

39. The system of claim 36, further comprising:
the first mobile device, configured to:
receive the first set of server application data, wherein:
the first set of server application data is received via the first wireless network using a first communication technique;
determine whether the first set of server application data is private server application data or shared server application data in accordance with the indication of being private server application data or the indication of being shared server application data, wherein:
the first set of server application data being determined to be private server application data indicates that the first set of server application data is intended for one of the first mobile device or the at least one other mobile device based on the address from the first mobile device;
the first set of server application data being determined to be shared server application data indicates that the first set of server application data is intended for each of the plurality of mobile devices; and
the first set of server application data is received via the first wireless network; and
transmit the first set of server application data via a second communication technique to the at least one other mobile device upon determination that the first set of server application data is shared server application data or upon determination that the first set of server application data is intended for the at least one other mobile device based on the address from the first mobile device, wherein:
the first communication technique and the second communication technique are different communication techniques.

40. The system of claim 39, further comprising:
the at least one other mobile device, configured to:
receive the first set of server application data from the first mobile device via the second communication technique.

41. The system of claim 40, wherein the computer system is further configured to:
determine that a second set of server application data is to be shared among the plurality of mobile devices; and
transmit, via the second wireless network, the second set of server application data to the at least one other mobile device.

42. The system of claim 41, wherein the at least one other mobile device is further configured to:
- receive the second set of server application data via the second wireless network using a third communication technique;
- determine whether the second set of server application data is to be shared among the plurality of mobile devices or whether the second set of server application data is not to be shared with the plurality of mobile devices; and
- transmit the second set of server application data via the second communication technique to other mobile devices of the plurality of mobile devices upon determination that the second set of data is to be shared.

* * * * *